United States Patent [19]

Acampora et al.

[11] Patent Number: 5,784,110
[45] Date of Patent: Jul. 21, 1998

[54] DATA PROCESSOR FOR ASSEMBLING TRANSPORT DATA PACKETS

[75] Inventors: Alfonse Anthony Acampora, Staten Island, N.Y.; Richard Michael Bunting, Hamilton Square, N.J.

[73] Assignee: General Electric Company, Schenectady, N.Y.

[21] Appl. No.: 648,151
[22] PCT Filed: Nov. 30, 1993
[86] PCT No.: PCT/US93/11583
  § 371 Date: May 23, 1996
  § 102(e) Date: May 23, 1996
[87] PCT Pub. No.: WO95/15650
  PCT Pub. Date: Jun. 8, 1995
[51] Int. Cl.$^6$ ............................................. H04N 7/24
[52] U.S. Cl. .................................. 348/423; 348/845.2
[58] Field of Search .................................. 348/423, 426, 348/429, 430, 467, 384, 387, 390, 845, 845.2; 375/242; H04N 7/12, 7/04, 7/24

[56] References Cited

U.S. PATENT DOCUMENTS 5,121,205  6/1992  Ng ............................................. 348/390
5,122,875  6/1992  Raychaudhuri .......................... 348/409
5,168,356  12/1992 Acampora ................................ 348/568
5,289,276  2/1994  Siracusa .................................... 348/467

Primary Examiner—Howard Britton
Attorney, Agent, or Firm—Joseph S. Tripoli; Eric P. Herrmann; Ronald H. Kurdyla

[57] ABSTRACT

In a digital television signal processing system, a special codeword, a Packet Alignment Flag (PAF (14), is inserted into an MPEG codeword bitstream to signify the presence of a Group of Pictures (GOP). The PAF immediately precedes a Picture Start codeword for an "I" frame, which initiates a GOP. A data packet (12) under construction when a PAF (14) appears is terminated since a GOP is intended to begin at a packet boundary. Such termination may result in an abbreviated packet of less than a prescribed number of codewords needed to complete a data packet. The last word of each packet is designated as such to facilitate the subsequent combining of data packets (12) with respective headers (18). An incomplete data packet is filled with null (zeroed bits) words to make up a complete data packet with a prescribed number of words.

7 Claims, 15 Drawing Sheets

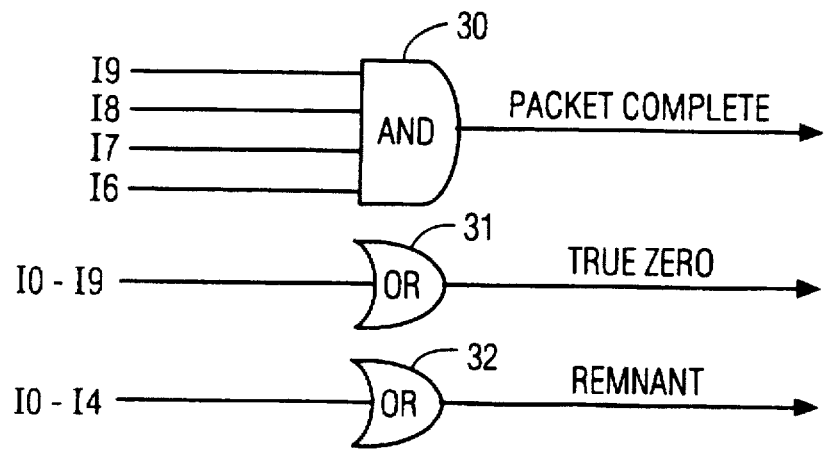
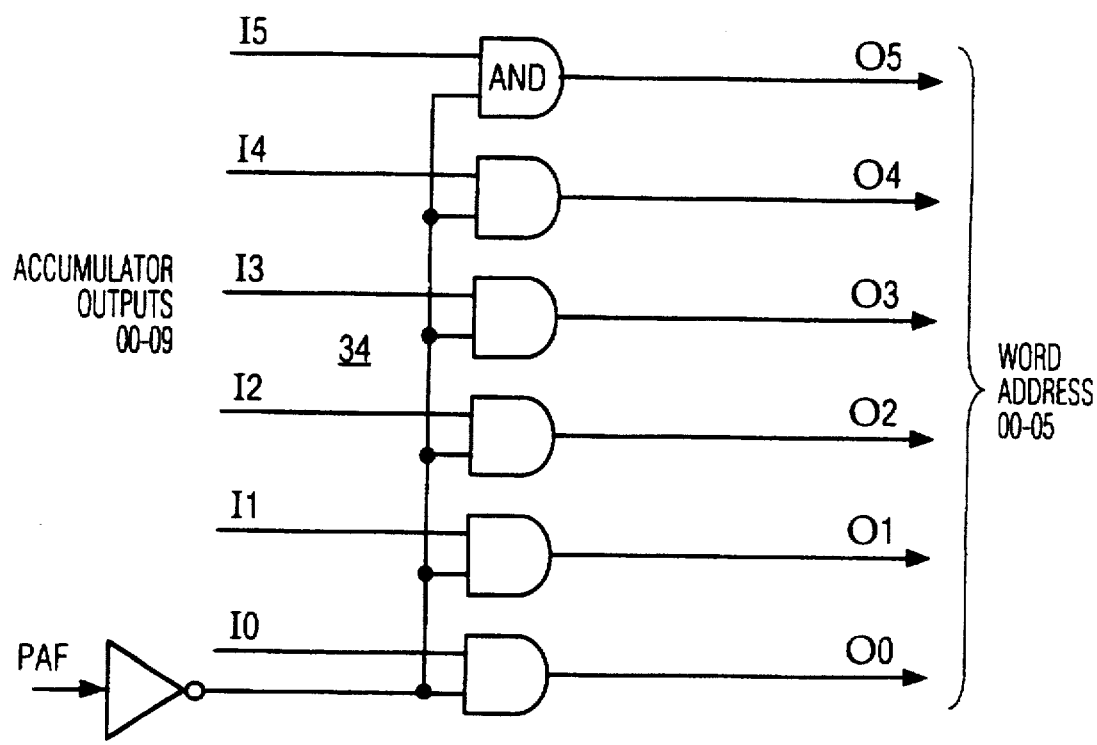
FIG. 2B

| INPUTS | | | | OUTPUTS | | | |
|---|---|---|---|---|---|---|---|
| PAF | PACKET COMPLETE | TRUE ZERO | REMNANT | W EN1 | W EN2 | W ZERO | |
| 1 | 1 | X | 1 | 1 | 1 | 0 | CASE 1 |
| 1 | 1 | X | 0 | 0 | 1 | 0 | CASE 2 |
| 1 | 0 | X | 1 | 1 | 0 | 0 | CASE 3 |
| 1 | 0 | 0 | 0 | 1 | 0 | 1 | CASE 4 |
| 0 | 1 | X | X | 0 | 1 | 0 | CASE 5 |
| 1 | 0 | 1 | 0 | 0 | 0 | X | CASE 6A |
| 0 | 0 | X | X | 0 | 0 | X | CASE 6B |

1 = PRESENT OR TRUE
0 = ABSENT OR FALSE

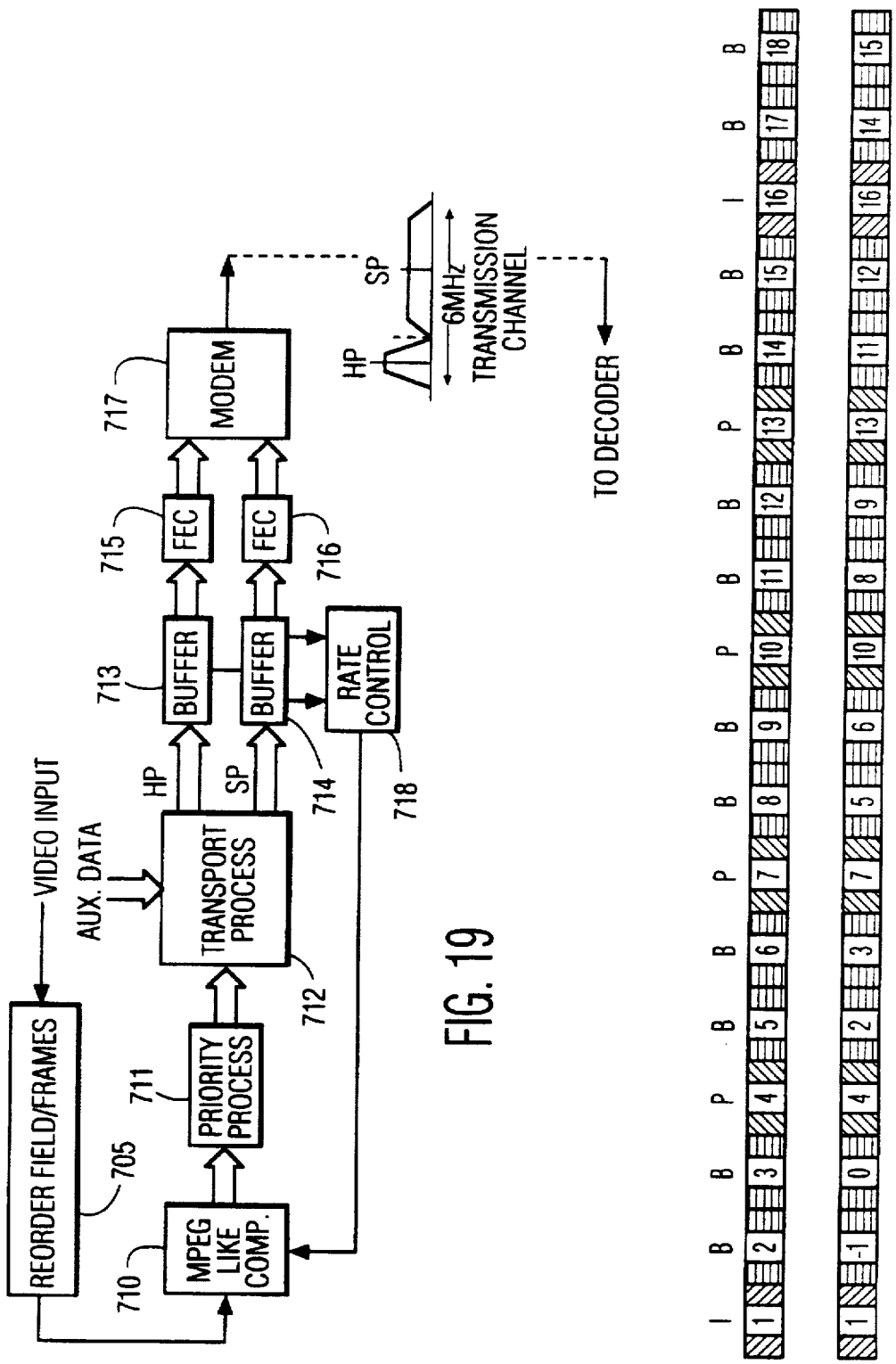

DATA PROCESSOR FOR ASSEMBLING TRANSPORT DATA PACKETS

FIELD OF THE INVENTION

This invention is related to the field of digital signal processing, and more particularly to method and apparatus for processing a datastream including transport packets conveying coded MPEG-like data in a high definition television system, for example.

BACKGROUND OF THE INVENTION

U.S. Pat. 5,168,356-Acampora et al. describes a system for processing a high definition television (HDTV) signal subjected to MPEG-like variable length coding. MPEG is a standardized coding format being established by the International Organization for Standardization. The standard is described in the document "International Organization for Standardization," ISO/IEC DIS 11172, Coding for Moving Pictures and Associated Audio for Digital Storage Media, Rev. Nov. 23, 1991 which document is incorporated herein by reference for description of the general code format. In the Acampora et al. system, codewords are prioritized to reflect high priority and low priority information in a datastream. The codeword datastream is passed to a transport processor which packs the codeword data into transport cells each including header and packed data payload sections, and which provides output high priority and low priority datastreams.

A major function of the transport processor is to pack variable length codeword data, issued by a preceding priority processor, into packed data words. An accumulation of packed words, called a data packet, is prefaced with a transport header.

The transport packet format enhances resynchronization and signal recovery at a receiver, eg., after a disruption due to a transmission channel disturbance, by providing header data from which a receiver can determine re-entry points into the data stream on the occurrence of a loss or corruption of transmitted data. Synchronization of data at an MPEG decoder also is facilitated by a Group of Pictures (GOP) beginning at a packet boundary. As will be seen, a GOP is a series of one or more pictures, or frames, intended to assist random access into a coded video bitstream sequence. Resynchronization is also facilitated by responding to an intracoded I-frame picture start codeword, and by placing the picture start codeword at a packet boundary, e.g., in a system according to the MPEG standard.

SUMMARY OF THE INVENTION

In accordance with the principles of the present invention, in a system conveying variable length codewords (e.g., MPEG codewords) in data packets, incomplete data packets having less than a prescribed number of words are packed with no-operation "zero words" to produce a fixed length packet, and to define an inter-packet boundary at which a prescribed codeword may appear.

In a disclosed preferred embodiment, a special codeword, a Packet Alignment Flag (PAF), is inserted into an MPEG datastream to signify the beginning of a Group of Pictures (GOP). The PAF immediately precedes a Picture Start codeword for an intracoded "I" frame, which initiates a GOP. The PAF indicates the imminent appearance of a Picture Start codeword, and encompasses one clock cycle during which certain "housekeeping" functions are performed before the Picture Start codeword appears at the beginning of the next packet. These housekeeping functions include, for example, resetting accumulators, checking header status, and generating a Last Word Indicator for the data packet under construction when the PAF appeared. When the PAF appears, a data packet under construction is terminated, since a GOP is intended to begin at a packet boundary. Such termination may result in an abbreviated packet containing less than a prescribed number of packed words. The abbreviated data packet is filled with null (zeroed bits) words to make up a complete data packet with a prescribed number of words, and to define an inter-packet boundary at which a picture start codeword may appear. Thirty 32-bit fixed length words form a data packet, which is prefaced by a 32-bit header.

BRIEF DESCRIPTION OF THE DRAWING In
the drawings:

FIGS. 2A, 2B and 2C show details of a word controller and data packer of FIG. 1.

FIG. 19 is a block diagram of an HDTV encoding system including apparatus according to the present invention.

FIGS. 20A and 20B are pictorial representations of sequences of image fields/frames of encoded video signals.

DETAILED DESCRIPTION OF THE DRAWINGS

Figure 1:
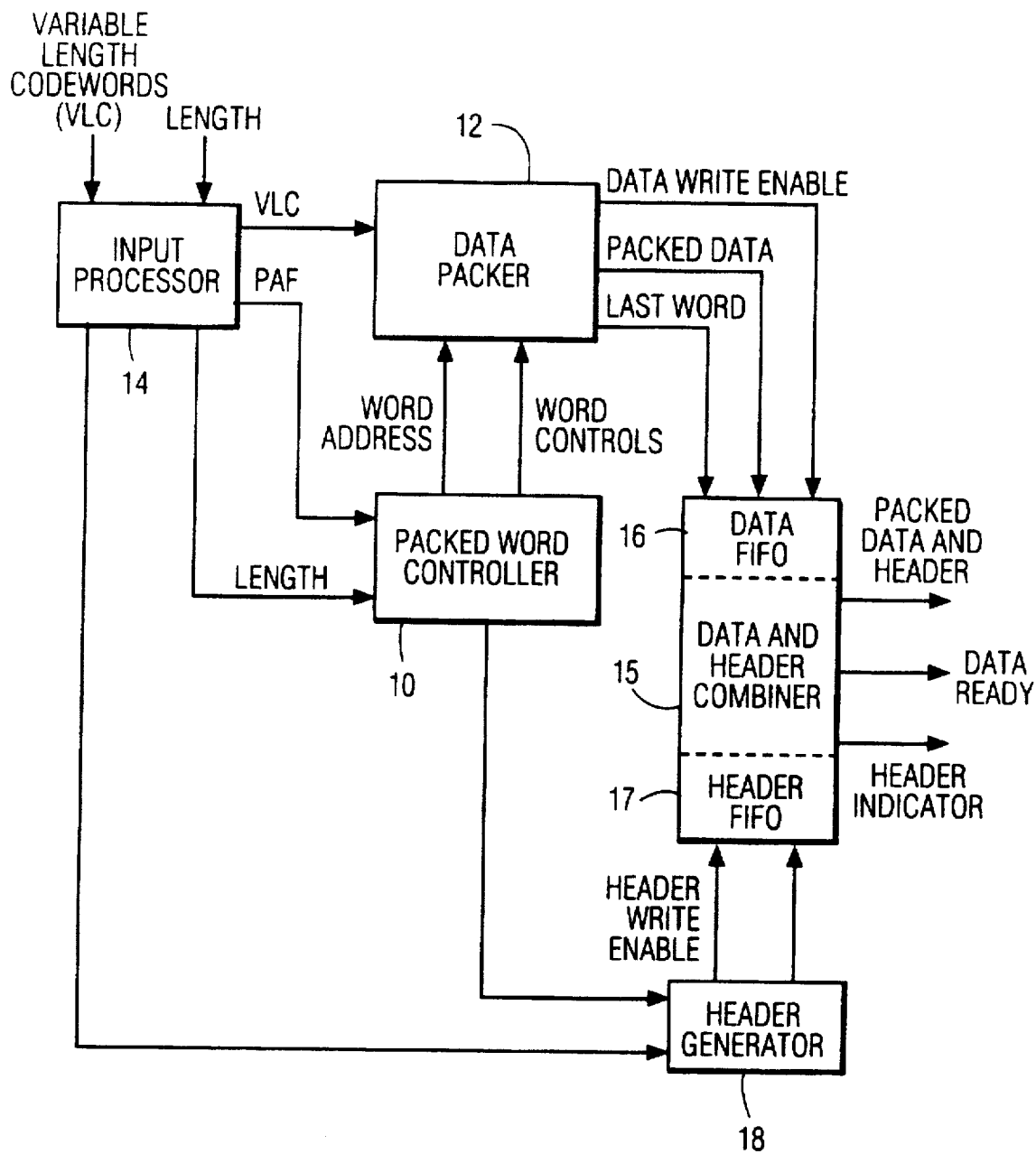
FIG. 1 is a block diagram of a portion of a video signal encoder including data word controller, data packer and data/header combiner apparatus according to the present invention.
Figure 21:
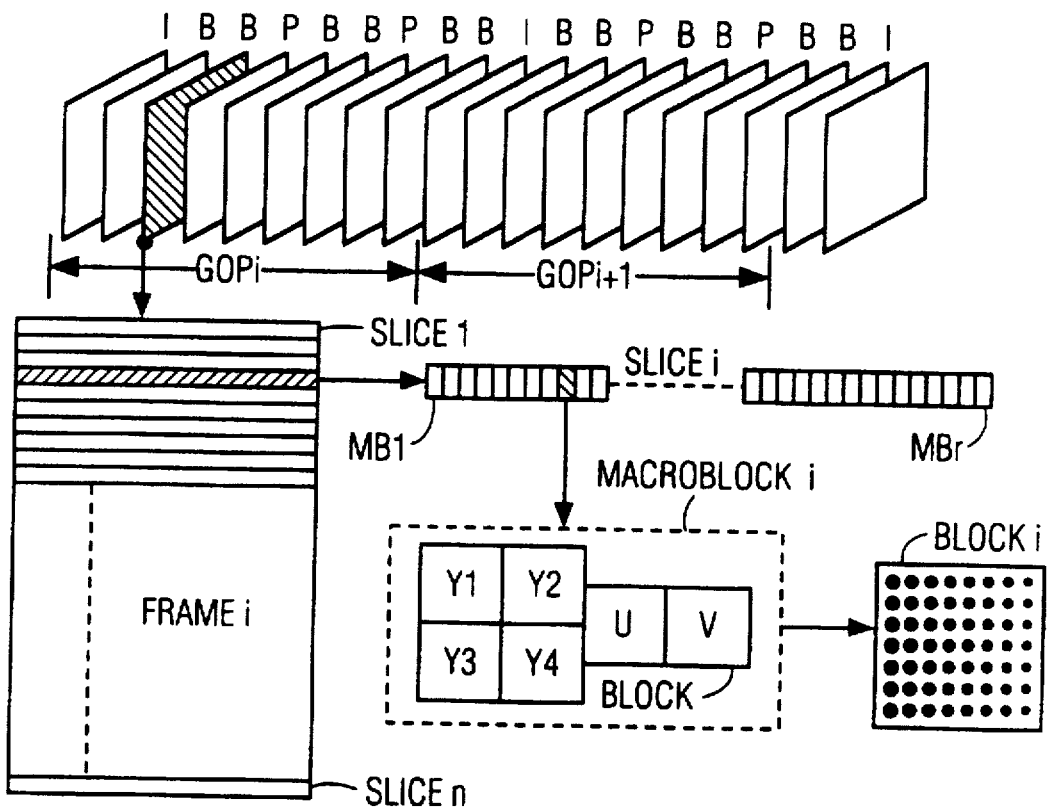
FIG. 21 is a pictorial representation of datablock generation developed by encoding/compression apparatus in the system of FIG. 19.

FIG. 1 is a block diagram of a data packer 12 and a packed data word controller 10 of a transport processor. As mentioned previously, a major function of a transport processor is to pack variable length codeword data into fixed length (e.g., 32 bit) data words. Thirty accumulated data words constitute a data packet, which is eventually prefaced by a transport header. Such a transport processor may be employed in a system for processing an MPEG-like compressed video signal, as will be discussed subsequently with regard to FIG. 19. Additional aspects of MPEG formatting and processing will be discussed in connection with FIGS. 20, 21 and 22.

Controller 10 monitors the accumulation of Length data words relative to a Packet Alignment Flag (PAF) to ascertain the completion of 32-bit data words, assembled from a stream of variable length codewords, and the completion of 960-bit long data packets. The Length data is a six bit parallel word coincident with a variable length codeword whose length it defines. The binary value of the Length word indicates the number of bits in the coincident variable length codeword that actually represent the MPEG codeword to be transported. Each variable length codeword appears on a 32 bit wide bus, with a variable number of valid bits (1 to 32) representing the MPEG codes.

The PAF is generated by input processor 14 so that the PAF appears one codeword immediately before an MPEG "I" (intracoded) frame Picture Start codeword at the beginning of a Group of Pictures. The PAF may be generated by sensing the presence of the I frame Picture Start codeword by means of a digital comparator. Unit 14 also includes a signal delay network for processing the Picture Start codeword and the PAF so that the PAF occurs in the codeword clock cycle immediately before the I frame Picture Start codeword. The delay network also assures that the output signals applied to units 10 and 12 exhibit proper time synchronism.

Word Addresses are passed to data packer 12, which receives the variable length codewords for packing, to insure proper concatenation of the input variable length codewords. Word Control signals are also presented to packer 12 to account for short words, to mark the last word in a packet, and to insure proper alignment of a sequence of thirty packed data words with an associated transport header. Controller 10 tracks the completion of packets by accumulating the binary values of the Length words. Each value represents the number of valid bits in the associated codeword. A packet is complete when 960 bits have been accumulated. The starting point, or initialization, of this count is provided by the appearance of the PAF, which causes internal accumulators within controller 10 to be reset.

Packer 12 receives the variable length codewords (VLC) via a 32 bit parallel data bus. The valid bits are packed into 32 bit words under the supervision of signals from controller 10. Concatenation is arranged to accommodate the eventual MPEG bit serial transmission order. The packed data from unit 12 is sent at a variable word rate to an input FIFO data buffer 16 of data and header combiner 15. Combiner 15 also receives a Data Write Enable signal from packer 12, which enables valid data to be written to FIFO data buffer 16 in combiner 15. A data packet is fully formed when thirty such words have been transmitted, unless a PAF forces a short packet. A Last Word indicator produced by packer 12 marks the thirtieth word in a normal packet in this example, or the last word in a packet shortened by the appearance of the PAF.

Packed data words are transmitted to data/header combiner 15 whenever the packed data words are available. Similarly, transport headers are transmitted from a header generator 18 to an input FIFO header buffer 17 of combiner 15 whenever the headers are available. Information utilized by header generator 18 to form headers is obtained from input processor 14 and word controller 10. A Header Write Enable signal indicates that a header is available, and enables the headers to be written to FIFO 17. Combiner 15 prefaces each packed data payload with an appropriate header, and forwards the resulting transport packet, or block, to an output rate buffer as will be seen in FIG. 19. Combiner 15 also provides an output Data Ready signal to signify that a packed data word or transport header is ready to be forwarded. A Header Indicator signal denotes that clock cycle in which the header is being forwarded. This signal acts as a transport packet boundary marker so that subsequent operations, such as Forward Error Correction (FEC), can be suitably applied to the transport cell.

Each header contains information related to the data in the data packet with which the header is associated. The header information aids data assembly and synchronization at a receiver, and includes information such as service type (e.g., audio, video, data), frame type, frame number and slice number, for example. A header of this type and its processing are described in the context of an HDTV digital signal processing system employing MPEG signal coding in U.S. Pat. 5,168,356—Acampora et al.

A data packet may contain less than thirty packed data words, from 1 to 29 words in this example. The PAF, provided by input processor 14, appears immediately before the Picture Start codeword of an intracoded I-frame at the beginning of a GOP, as will be discussed in connection with FIGS. 20–22. The Picture Start codeword for an intracoded frame always starts a new packet, and the immediately preceding PAF signifies the end of a data packet and the beginning of a new packet. Packet alignment of this Picture Start codeword is instrumental for rapid acquisition of the data stream at a receiver. When the PAF occurs during the formation of a fixed length word, an abbreviated data packet is formed. The remaining bits in the packed word under construction are filled with a number of "zeroed bits" (from 1 to 31) in data packer 12. In addition, the remaining words in the data packet will likewise be filled with "zeroed words" (from 1 to 29) in combiner 15, so that the transport packet size is maintained. The need for such "zero word fill" is indicated by the appearance of a Last Word indicator before thirty data words have been transmitted to combiner 15.

The proper identification of the Last Word in a data packet is important. The Last Word insures proper registration of a constructed packet with its associated transport header. The Last Word also accounts for the filled packet at the MPEG Group Of Pictures boundaries (i.e., intracoded frame), which is vital for resynchronization at a television receiver/decoder such as after channel changing. Determination of the Last Word is not a trivial matter, and relies on specific knowledge of packet status such as when a packet is completed, and if completed, whether or not there is data segmentation into the next packet. There are conditions when the Last Word is the word formed in the current clock interval or the word to be formed in the next clock interval.

Some specific examples of Last Word formation are as follows. In the absence of a PAF when a packet is complete the last word (the thirtieth word in this example) is the last word and is so marked by a Last Word Indicator. This is an example of a "true" Last Word. A PAF may occur as a packet is completed with no bits segmenting into the next packet, i.e., the word ends exactly on a packet boundary. The last word of a completed packet is marked as a Last Word because it is so in fact. This is another example of a "true" Last Word. A PAF also may occur as a packet is completed with some bits segmenting into the first word of the next packet. In this case two successive Last Words are formed and marked accordingly. The last word of the completed packet is marked as Last (a "true" Last Word), and the first word of the next packet is marked as Last because the PAF forces the packet abbreviation. In the latter case of an abbreviated packet, the Last Word appearing before 30 words have been sent results in "zero word filling" to complete the packet. Other examples of a Last Word follow. A PAF may occur at a time when an incomplete packet is under construction. If an internal word is completed with some bits segmenting into the next word, then the partial word becomes the Last Word. A particularly troublesome situation is presented when an incomplete packet is under construction and an internal word is completed with no bits segmenting into the next word. The internal word may be conveyed to the data/header combiner before subsequent data (i.e., appearance of the PAF) indicates that this word was a last word, too late for it to be properly marked as such. In this case a zero word called a "pseudo" last word is generated and marked as the last word. Such a pseudo last word is formed entirely of zero bits, in contrast to, for example, a segmented (incomplete) last word which is partially padded with zero bits. These and other examples will be discussed with regard to FIGS. 5–16.

Among the significant aspects of the disclosed system to be described below are the generation of the zero length PAF to signal the imminent beginning of a GOP, as well as to facilitate generating and marking the Last Word in a data packet, generating a pseudo Last Word when needed, and generating specific signals associated with variations in the occurrence of a Last Word.

Figure 2A:
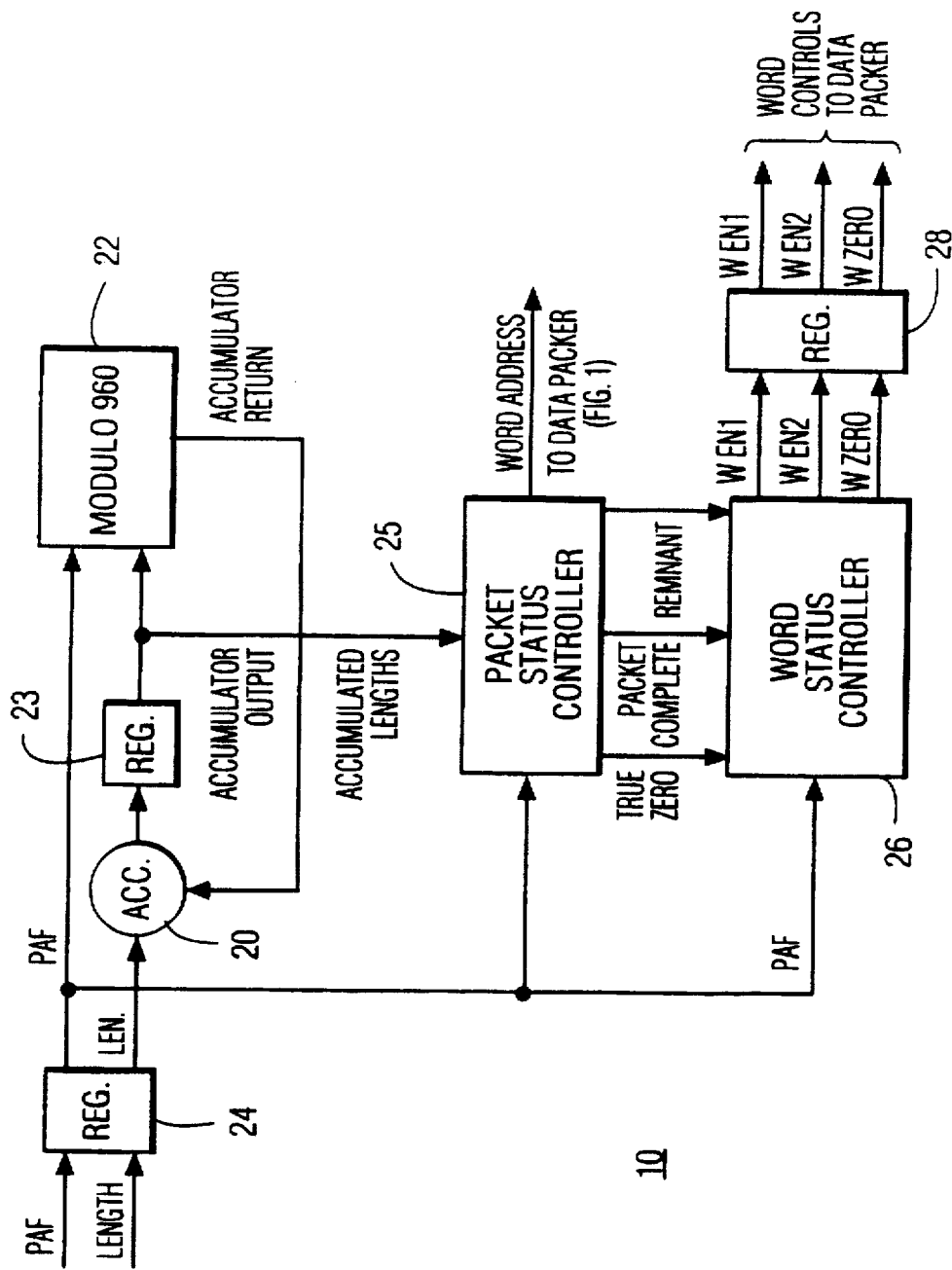

FIG. 2A shows details of controller 10 of FIG. 1. The controller includes an accumulator 20 in a feedback arrangement with a modulo 960 circuit 22. A buffer register 23 is included in the feedback loop to hold the newly accumulated value at the end of each Length input cycle. Input PAF and Length words are conveyed via an input register 24 to modulo unit 22 and accumulator 20, respectively. The values of the Length words are successively accumulated by unit 20, and the feedback combination of accumulator 20 and modulo 960 unit 22 sets the length of a packet at 960 bits. The accumulator output from register 23 represents the bit position within a packet and is conveyed to a packet status controller 25.

Packet status controller 25 also receives a PAF from input buffer register 24, and issues output signals required to create the writing instructions in word status controller 26. A Packet Complete output signal is issued to word status controller 26 when the accumulator bit count is equal to or greater than 960. An output Remnant signal is issued by controller 25 when the accumulator bit count is not on a word boundary (i.e., a bit count not equal to an integer multiple of 32). A True Zero output signal is issued when the accumulator bit count is zero. This signal is significant in determining the correct formation of the last word only when a PAF is present. A logic circuit for generating these signals is shown in FIG. 2B, discussed below.

Accumulator 20 idles, and holds the last bit count value, when zero value Length words are received indicating the presence of zero length null codewords, i.e., no-operation (NO-OP) codewords. One exception to this rule is that a PAF will always force the accumulator value to zero regardless of the bit count. Another exception occurs when a packet is completed exactly on a packet boundary (i.e., the accumulator count is 960). In the next clock cycle, the accumulator count will be corrected to the binary value of the next Length word via modulo 960 unit 22. A packet is complete when the accumulator count is equal to or greater than 960.

In FIG. 2B, the 10 bit accumulator outputs, representing the accumulated lengths, are designated as I0 to I9. A packet is completed if the accumulated lengths of the packed codewords is equal to or greater than 960. This condition is indicated when the four MSB bits of the accumulator, I6 to I9, are in a logic 1 state, as applied to an AND gate 30. True Zero is indicated when all ten accumulator bits are in a logic state 0, as applied to an OR gate 31. A "no remnant" condition is indicated when the five LSB accumulator bits, I0 to I4, are in a logic state 0, as applied to an OR gate 32. The data packer Word Address is formed in response to the six LSB accumulator bits, I0 to I5. AND gate array 34 forces the Word Address to a logic state 0 (Word Address reset) when the Packet Alignment Flag (PAF) is encountered.

Figure 2C:
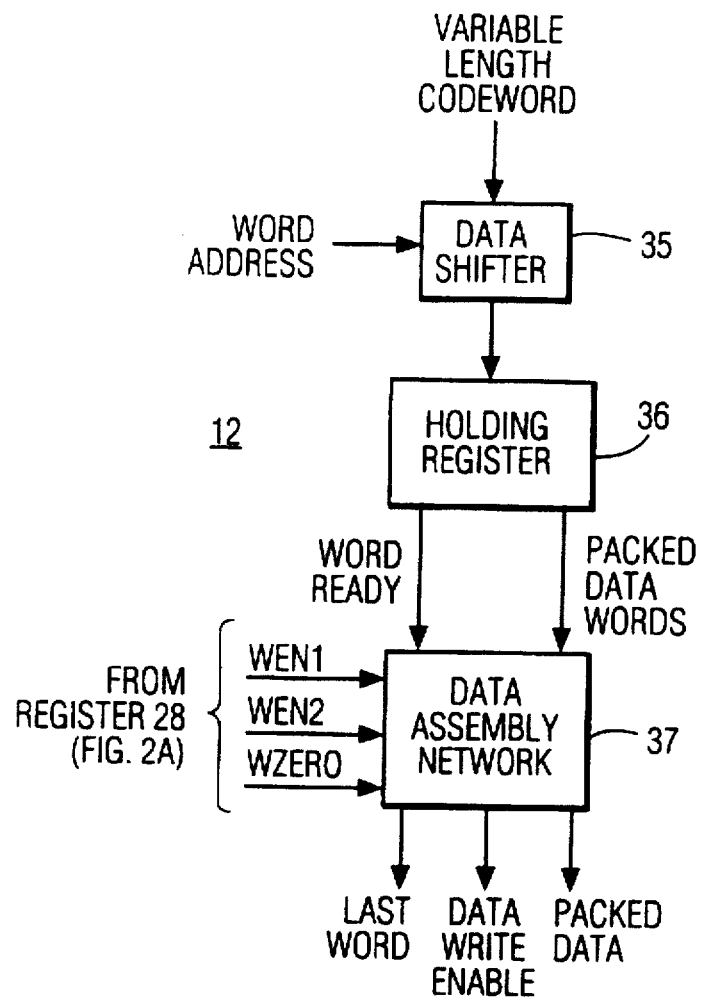

FIG. 2C shows details of data packer 12 of FIG. 1. Variable length codewords are presented to a data shifter 35.

The shifter can be a barrel shifter such as Texas Instrument type 74AS8838. To appropriately position the valid bits of the variable length codewords for concatenation, an LSB subset of the length accumulator output emanates from the packet status controller 25 (see FIGS. 2A and 2B) and is presented to the data shifter as the Word Address. When a 32 bit word has been formed from the concatenation of the variable length codewords, the packed word is transferred to a holding register 36. The availability of the packed data word is flagged by a Word Ready signal issued by register 36, so that the word can be transferred to a data assembly network 37. Data assembler 37 uses control signals WEN1, WEN2 and WZERO from packed word controller 10 (FIG. 1) to issue the packed data word with its Data Write Enable and Last Word flag to a FIFO buffer contained within data and header combiner 15 of FIG. 1.

The insertion of the next transport headers into the combined data stream follows the transmission of the last word in a packet such that the header for the next packet is inserted after the last word of the current packet. The Accumulator Output (FIG. 2A) is used by a Header Controller to indicate the position of certain codewords in the packet so that these positions can be described in entry point fields within the header. The creation of Last Word indicators and flags enabling data words to be written to a FIFO buffer is facilitated by logic arrays associated with word status controller 26 and data assembly network 37. Table 1 below shows the action states for creating the last word in response to logic array inputs PAF (Packet Alignment Flag), PC (Packet Complete), TZ (True Zero) and REM (Remnant, the word segmentation indicator). The formation of the output signals from data assembly network 37 is facilitated by output signals from controller 26, supplied via buffer register 28. These signals include a write enable signal W EN1 which signifies a last word appearing in the next clock cycle, a write enable signal W EN2 signifying a last word appearing in the current clock cycle, and a write zero signal W ZERO which creates a pseudo Last Word. This pseudo Last Word occurs when a PAF coincides with the packet formation residing at an internal codeword boundary of an incomplete packet.

TABLE 1

WORD STATUS CONTROLLER STATES

| PAF | PC | TZ | REM | ACTION TAKEN |
| --- | --- | --- | --- | --- |
| YES | YES | N/A | YES | Flag current word as Last Word, then flag word on next clock also (CASE 1) |
| YES | YES | N/A | NO | Flag current word as Last (CASE 2) |
| YES | NO | N/A | YES | Flag word on next clock as Last (CASE 3) |
| YES | NO | NO | NO | Form a pseudo Zero Word on next clock, and flag it as Last Word (CASE 4) |
| NO | YES | N/A | N/A | Flag current word as Last (CASE 5) |
| YES | NO | YES | NO | None (CASE 6a) |
| NO | NO | N/Z | NA | None (CASE 6b) |

NOTE 1: Last Word flag on current words are signaled by Write Enable 2.
NOTE 2: Last Word flag on words in the next clock are signaled by Write Enable 1.
NOTE 3: Formation of pseudo word is signaled by Write Zero and flagged by Write Enable 1.

Figures 3, 4:
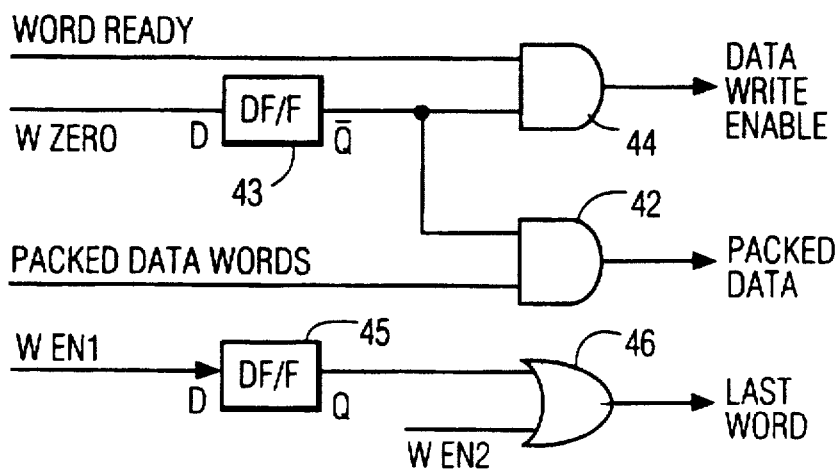
FIG. 3 is a truth table associated with the operation of a word status controller shown in FIG. 2A.
FIG. 4 shows details of a packed data assembler network.

A truth table for generating WEN1, WEN2 and WZERO is shown in FIG. 3 for various examples of operating conditions (cases 1–6 of Table 1), as will be further discussed in connection with FIGS. 5–16. The algorithm for Table 1 is given in Appendix A. The output signals from controller 26 are supplied to an output buffer register 28 before being provided as output word control signals to a data assembler network shown in FIG. 4.

The data assembler network of FIG. 4 comprises an output network of data packer 12 in FIG. 1. The data assembler comprises AND logic gates 42 and 44, an OR logic gate 46, and D-type flip-flops 43 and 45 arranged as shown. Packed 32 bit wide Data Words are passed to a data FIFO via AND logic gates 42, and a Word Ready signal from preceding packer circuits is passed via AND logic gate 44, and becomes the Data Write Enable signal for data FIFO 16 in FIG. 1. Data write control signals W EN1, W EN2 and W ZERO from the packed word status controller (FIG. 2A) are applied to flip-flops 43 and 45 and logic gate 46 as shown. W EN2 indicates a Last Word flag associated with a current word, and W EN1 indicates a Last Word flag associated with a word in the next clock cycle. The W ZERO control indicates the formation of a pseudo Last Word (case 4 in Table 1) which is flagged as a last word by W EN1. In this case an all-zero word, referred to as the pseudo last word, is inserted into the Packed Data word stream, and is written to data FIFO 16. The Word Ready input signal to assembler gate 44 is provided by a holding register 36 (FIG. 2C) to signify the availability of a packed 32-bit word.

The following discussion refers to the examples of last word generation illustrated by FIGS. 5–16. Some of these examples show the effect of zero length NO-OP words coincident with, following and preceding the PAF.

Figure 5:
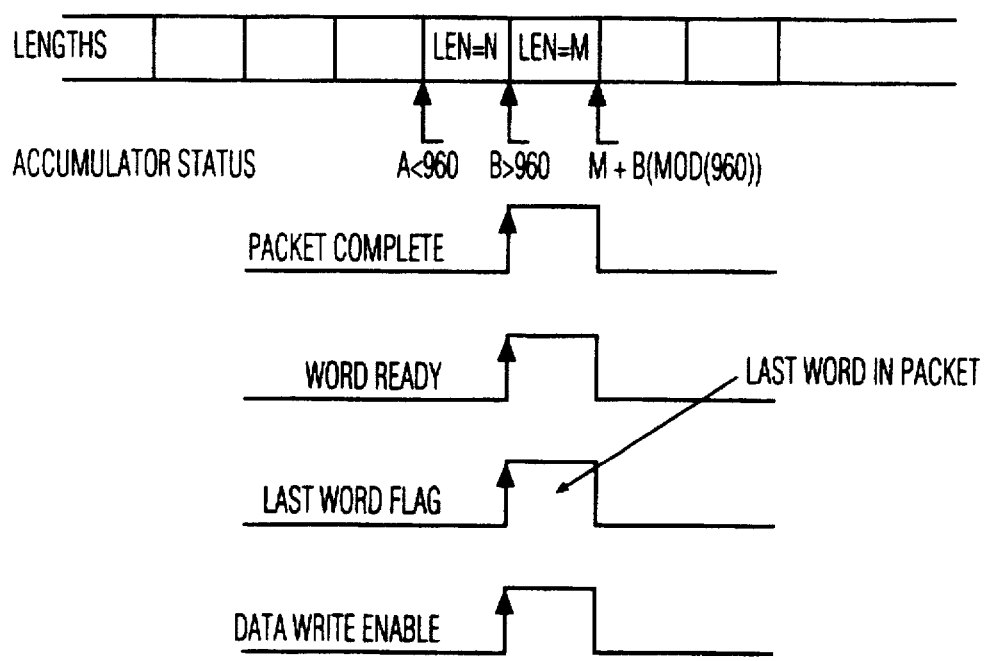
FIGS. 5–16 depict examples of last word generation.
Figure 6:
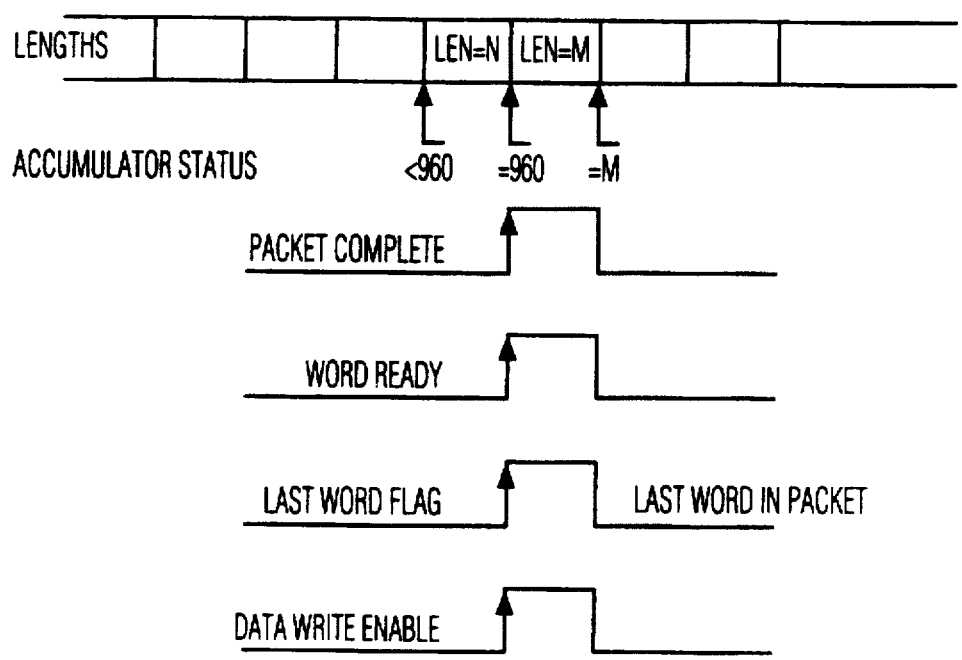

FIGS. 5 and 6 illustrate variations of Case 5 in Table 1. In FIG. 5, a packet is completed with segmentation into the next packet (i.e., accumulator bit value greater than 960). In FIG. 6, a packet is completed exactly on a packet boundary (i.e., accumulator value equal to 960), with no segmentation or remnant into the next packet. In both cases, a Last Word flag occurs at the Packet Complete time. This occurrence is independent of True Zero and Remnant indications because a PAF is not present. Otherwise, True Zero and Remnant indications would have to be considered in the presence of a PAF.

Figure 7:
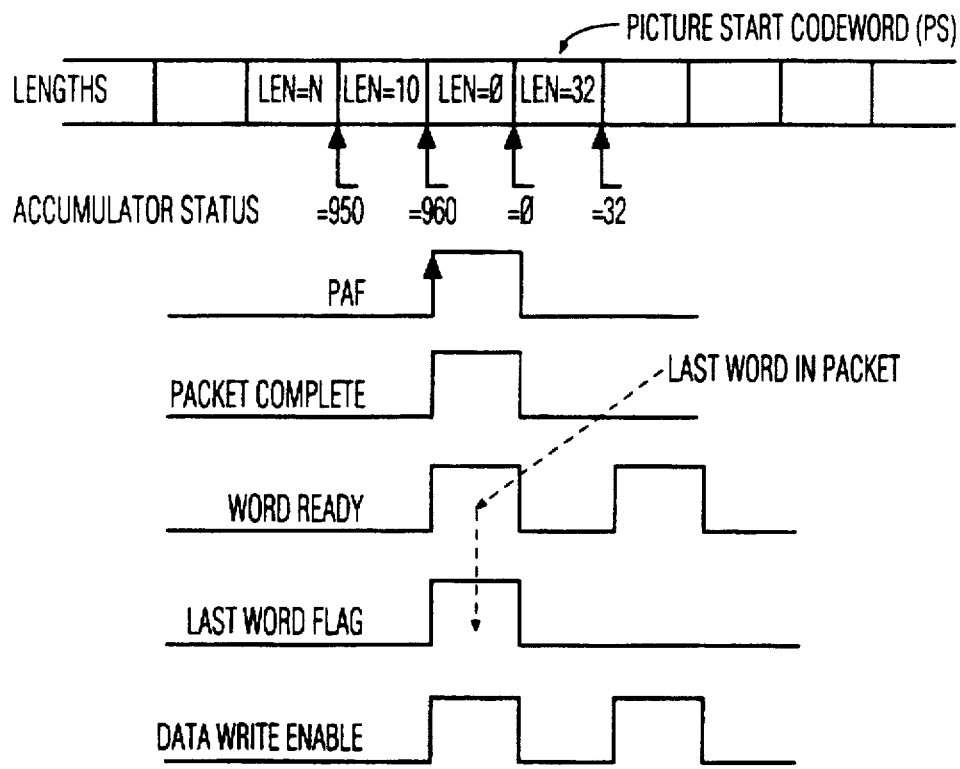
Figure 8:
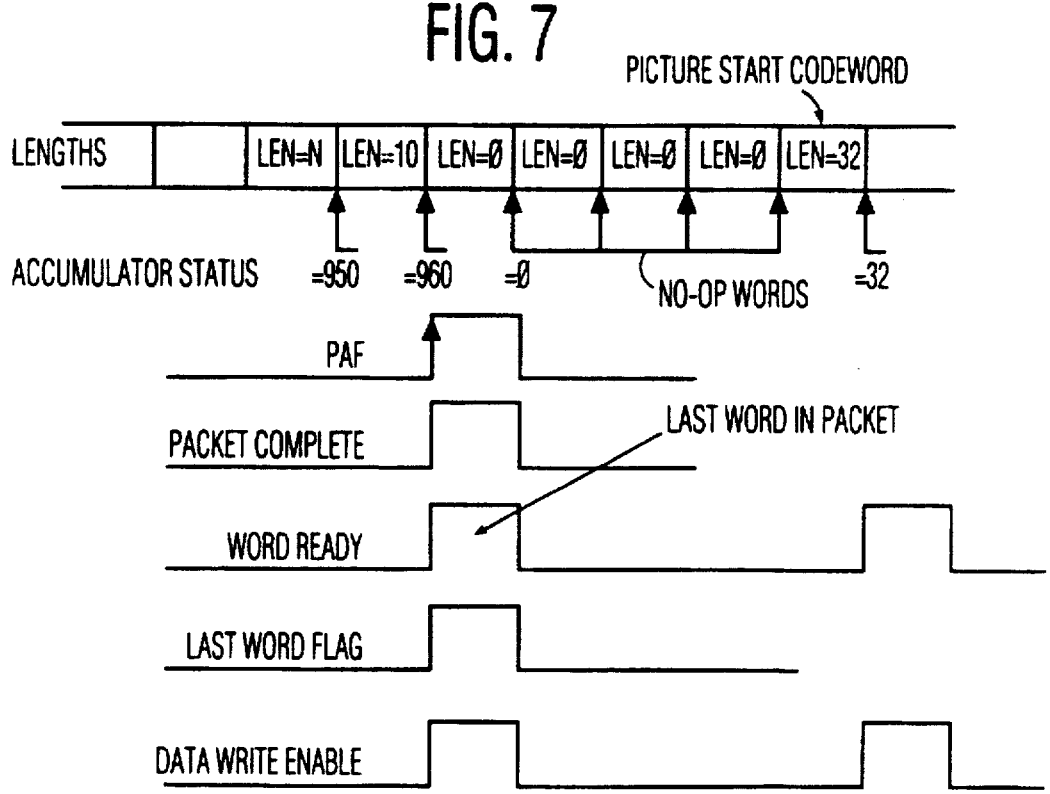

FIGS. 7 and 8 illustrate Case 2 of Table 1. In FIG. 7 a PAF occurs immediately after a packet is completed, with no segmentation, followed by a 32-bit Picture Start codeword. FIG. 8 is similar except that three intervening zero length no-operation (NO-OP) code words precede the Picture Start codeword. In both FIGURES, a PAF coincides with a Packet Complete signal, and the packet ends without remnant segmentation into the next packet. FIG. 7 shows the more typical case where a 32 bit length Picture Start codeword follows immediately. FIG. 8 indicates that intervening NO-OP words are tolerated.

Figure 9:
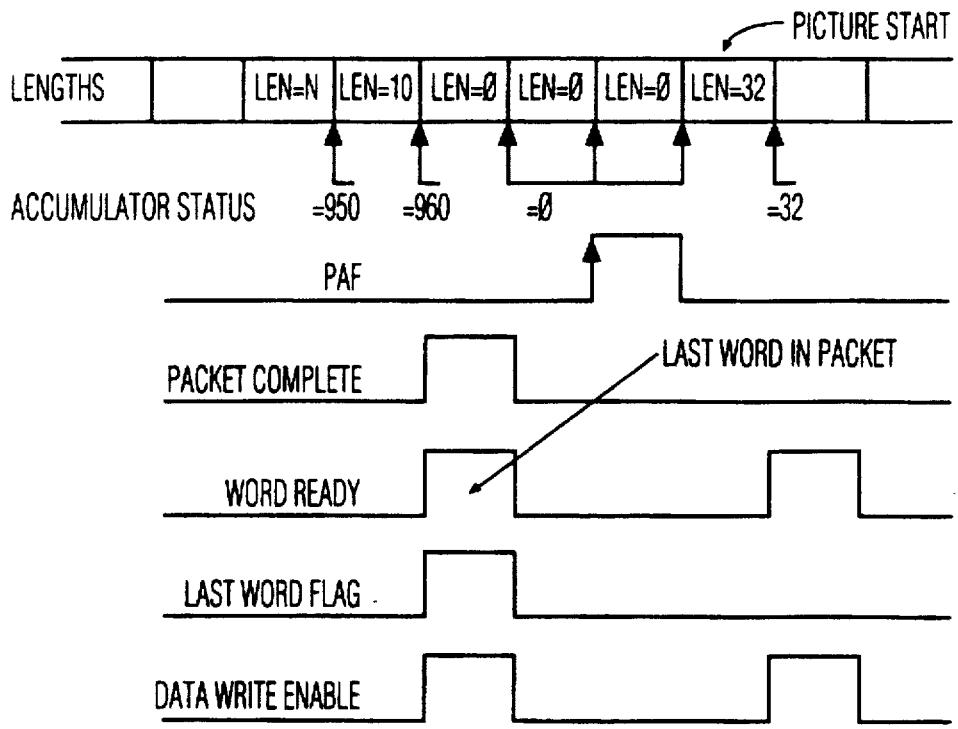

FIG. 9 pertains to Case 6a of Table 1, where a PAF does not coincide with a Packet Complete signal. The PAF occurs after a packet is completed, with no segmentation and after NO-OP words, followed by a Picture Start codeword. In this case a Last Word indication is associated with the Packet Complete signal, but there is no Last Word indication associated with the PAF because a True Zero indication is involved in this case, due to the accumulator idling at zero.

Figure 10:
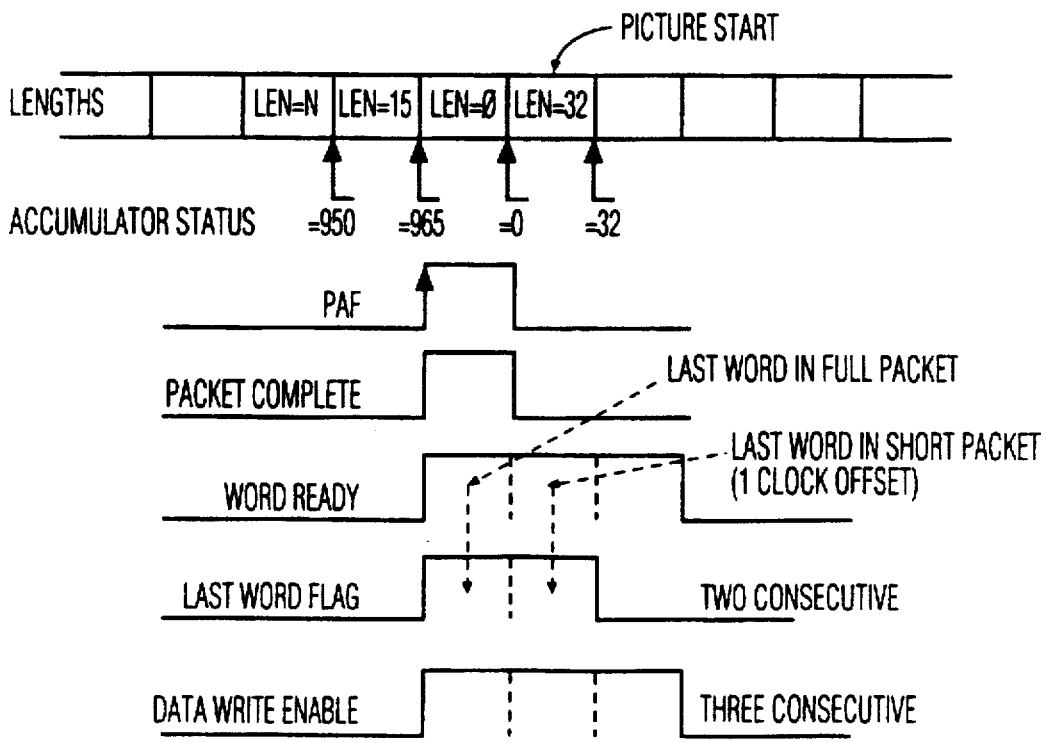
Figure 11:
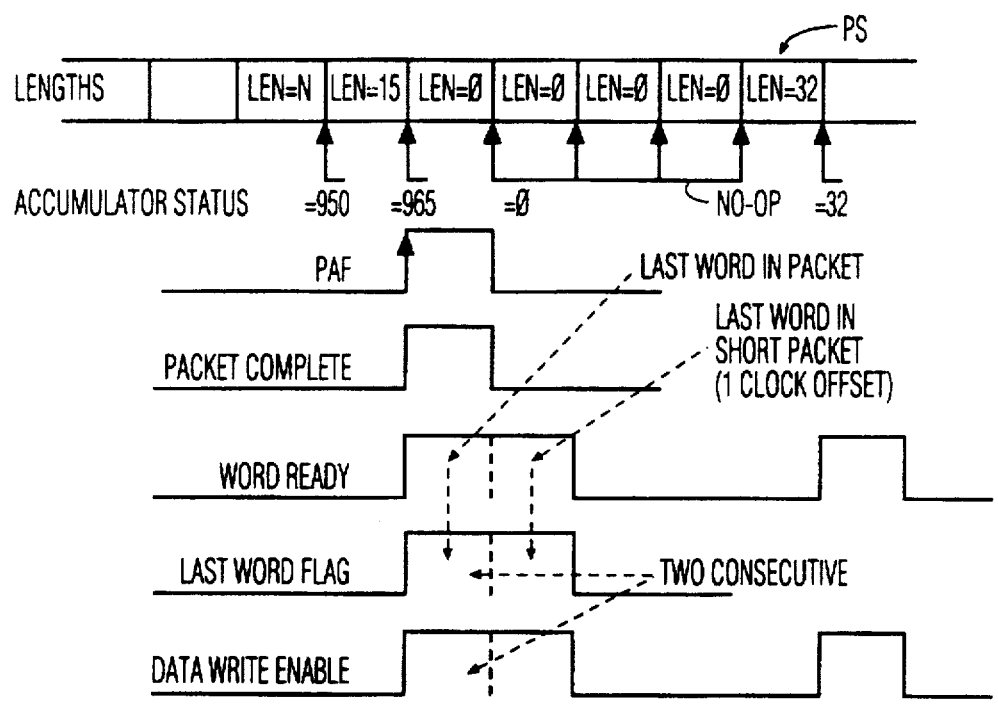

FIGS. 10 and 11 illustrate Case 1 of Table 1. In FIG. 10 a PAF occurs immediately after a packet is completed, with segmentation, followed by a Picture Start codeword. FIG. 11 is similar to FIG. 10 except that intervening NO-OP words precede the Picture Start codeword. Two Last Word indicators are required because of the segmentation remnant. One Last Word indicator occurs at the Packet Complete interval, and the other occurs one clock interval after the PAF because of the segmentation.

Figure 12:
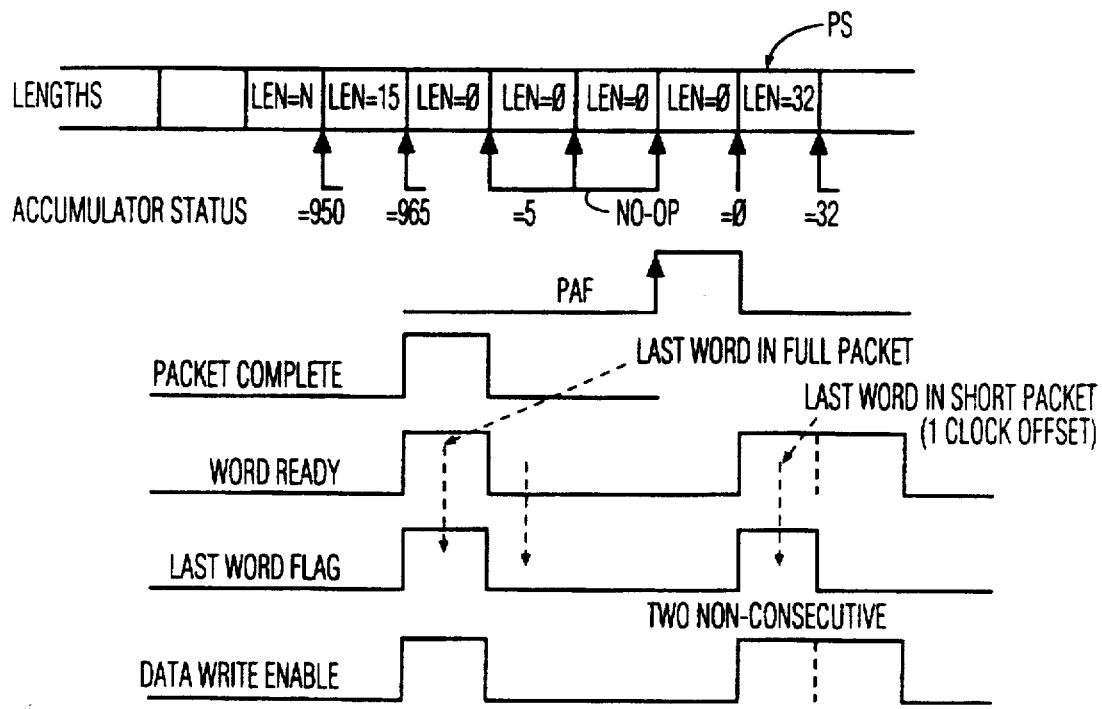
Figure 13:
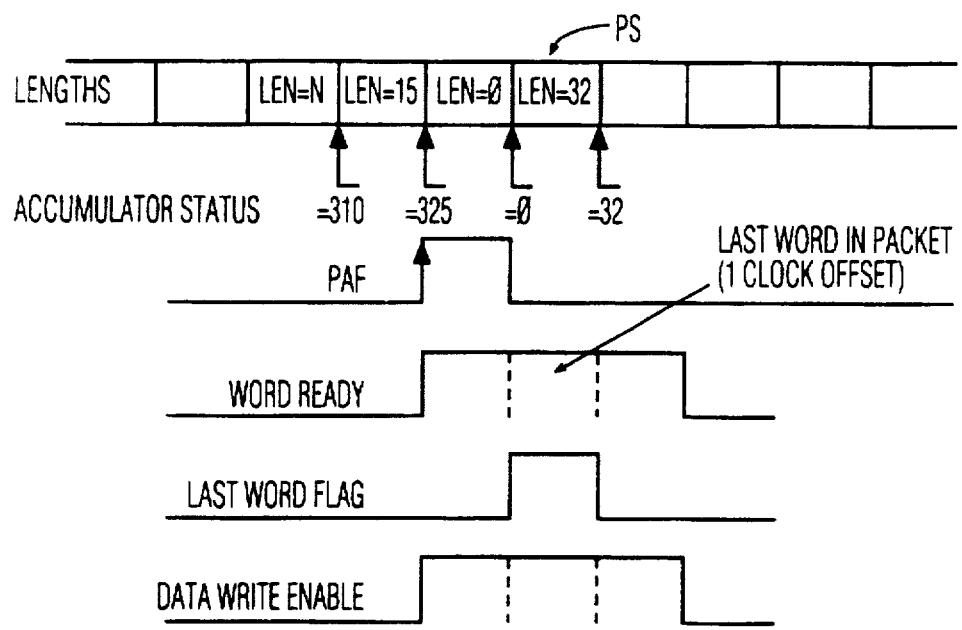
Figure 14:
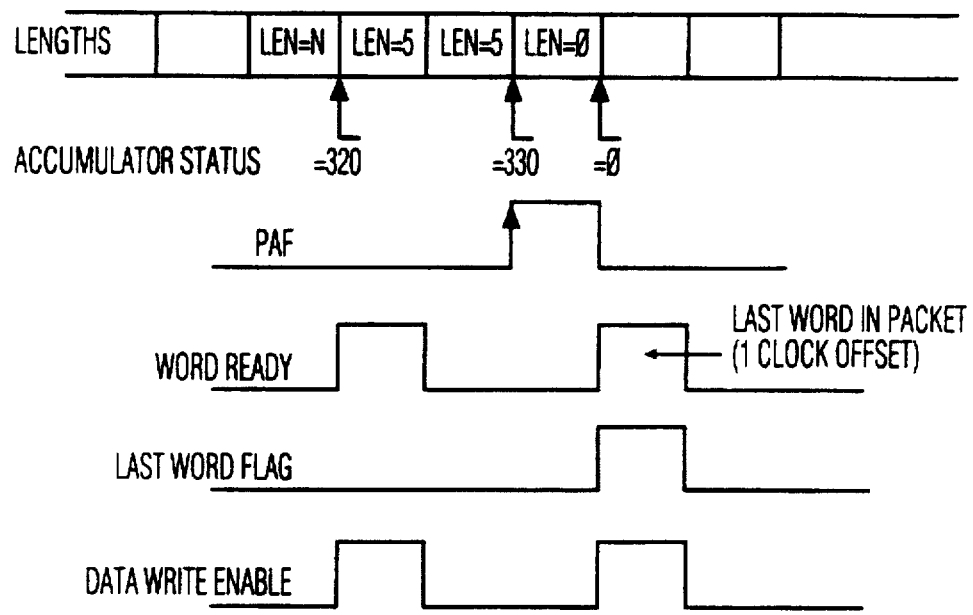

FIGS. 12, 13 and 14 illustrate Case 3 of Table 1. In these examples a PAF occurs sometime during the packet formation, but not on a word boundary (i.e., there is segmentation into the next word), and not coincident with a Packet Complete indication. The Last Word signal then normally occurs at the next clock interval after the PAF as a result of the partially started word (due to segmentation). In FIG. 12, the PAF occurs after a packet is completed, with segmentation and after some NO-OP words, followed by a Picture Start codeword. In FIG. 13, a PAF occurs immediately as a word is completed, with segmentation, followed by a Picture Start codeword. In FIG. 14 a PAF occurs after a word is completed, and after several codewords have caused segmentation.

Figure 15:
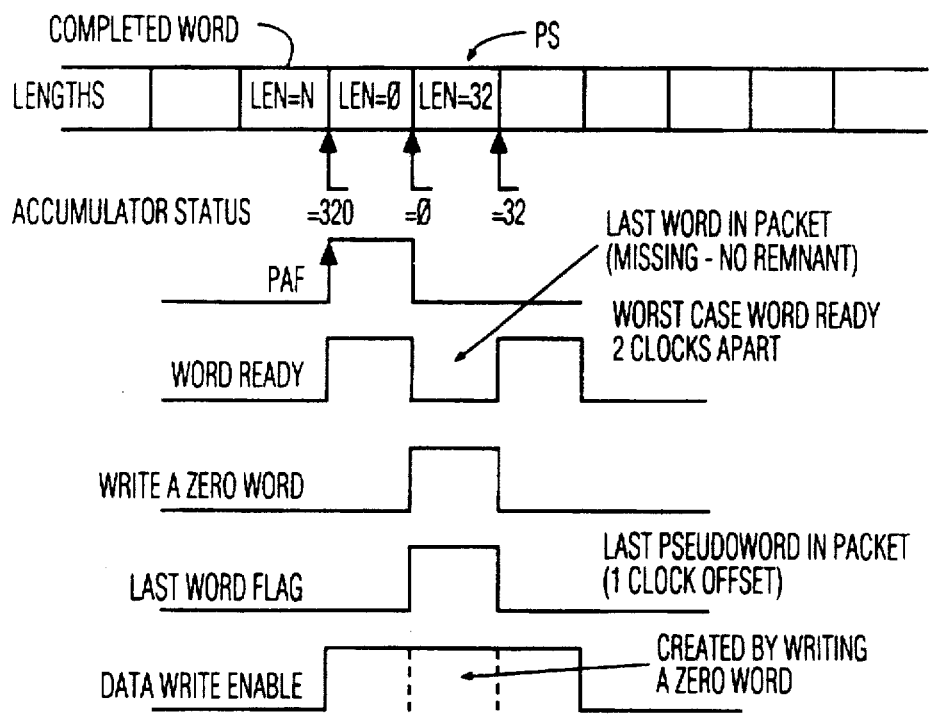
Figure 16:
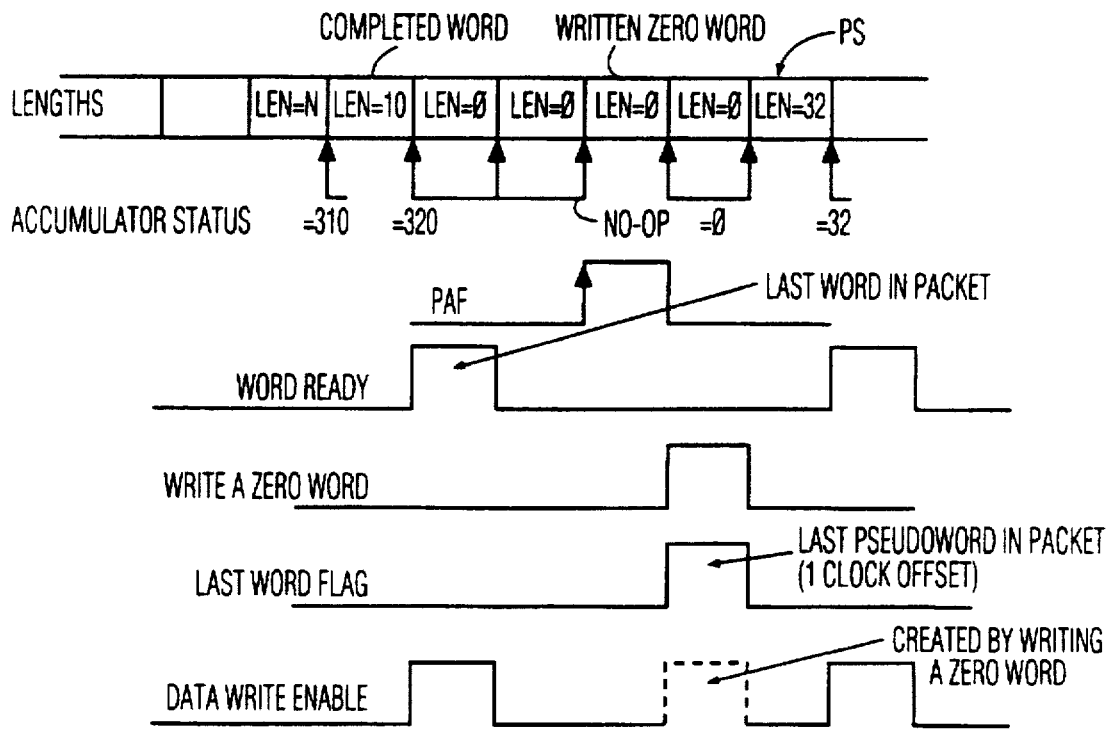

FIGS. 15 and 16 illustrate Case 4 of Table 1, concerning the need to create a particular type of last word, the pseudo last word. This case involves a PAF occurring immediately after (FIG. 15) or some time after (FIG. 16) a word is completed without segmentation, i.e., directly on a word boundary multiple of 32. The premise in this case is that the completed word has been issued in advance of the knowledge (provided by the subsequent PAF) that it was the last word. An all-zero pseudo last word is formed and issued. This is tolerable because MPEG allows any number of leading zeros before a start codeword, and the Picture Start codeword is guaranteed to be next by the occurrence of the PAF. Moreover, in these cases, the balance of the packet would be filled with zeroed bit (null) words by the data/header combiner. Since one zero word has been issued and pseudo-marked as last, the combiner will issue one less word in this case. In FIG. 15, a PAF occurs immediately as a word is completed (without segmentation), followed by a Picture Start codeword. In FIG. 16 a word is completed (without segmentation) and followed by intervening NO-OP words. Afterwards a PAF occurs, followed by a Picture Start codeword.

Figure 17:
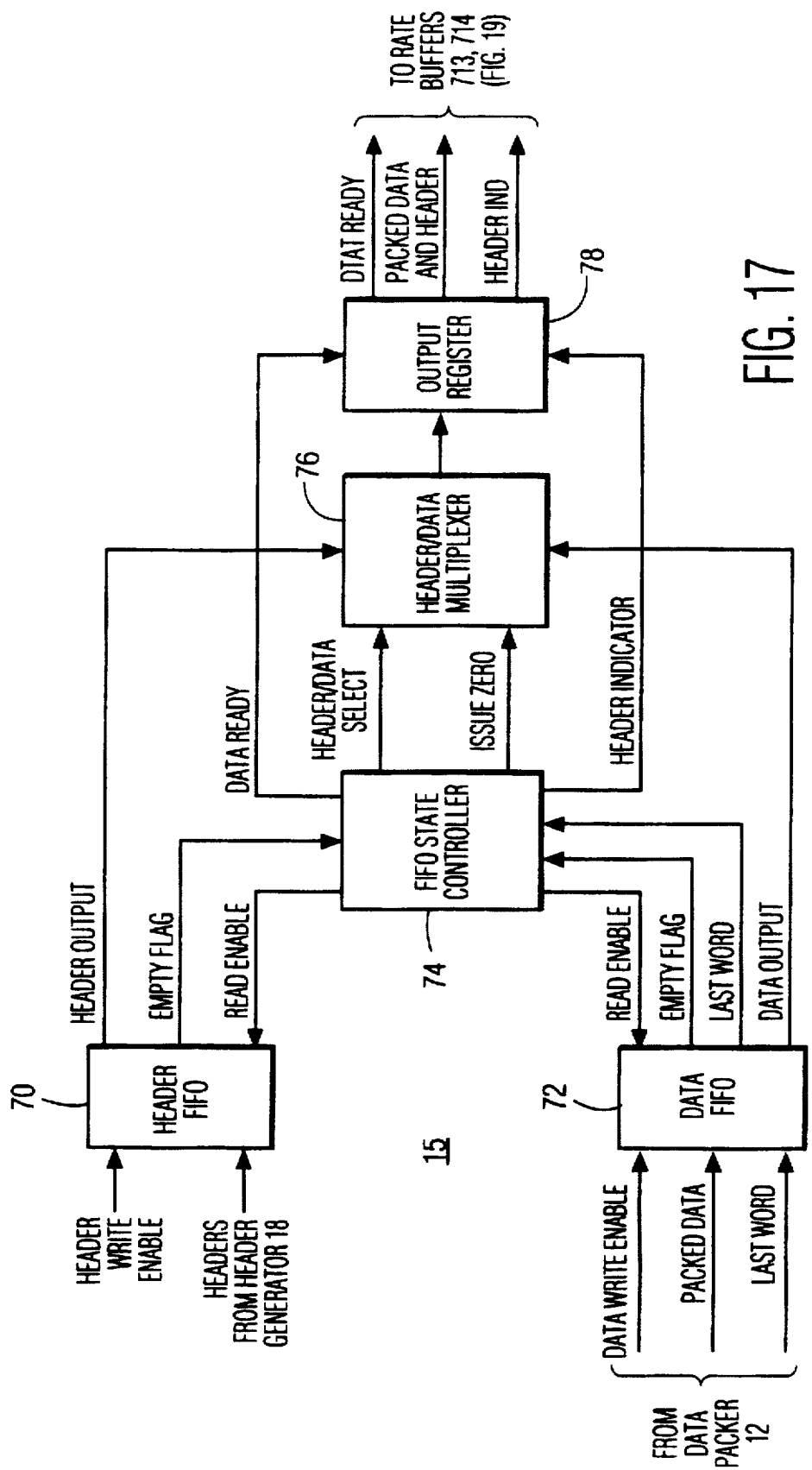
FIG. 17 shows details of a data and header combiner unit shown in FIG. 1.

FIG. 17 shows additional details of Data/Header combiner (FIG. 1). Header components are written into a header FIFO 70, in response to a Header Write Enable signal, whenever the headers are produced by header generator 18. Similarly, packed data words are written into a data FIFO 72, in response to a Data Write Enable signal, whenever such words are produced by data packer 12. A Last Word indicator, produced in the data packing process, accompanies the last word in a packet whether or not such word is the thirtieth word. Header and data outputs of units 70 and 72 are multiplexed onto a common bus by means of multiplexer 76, and applied to an output register 78. Register 78 provides a Data Ready signal, Packet Data and Headers, and a Header Indicator to rate buffers 713 and 714 as shown in FIG. 19. Multiplexer 76 is capable of issuing zero words on command, in response to an Issue Zero signal from FIFO state controller 74.

Figure 18:
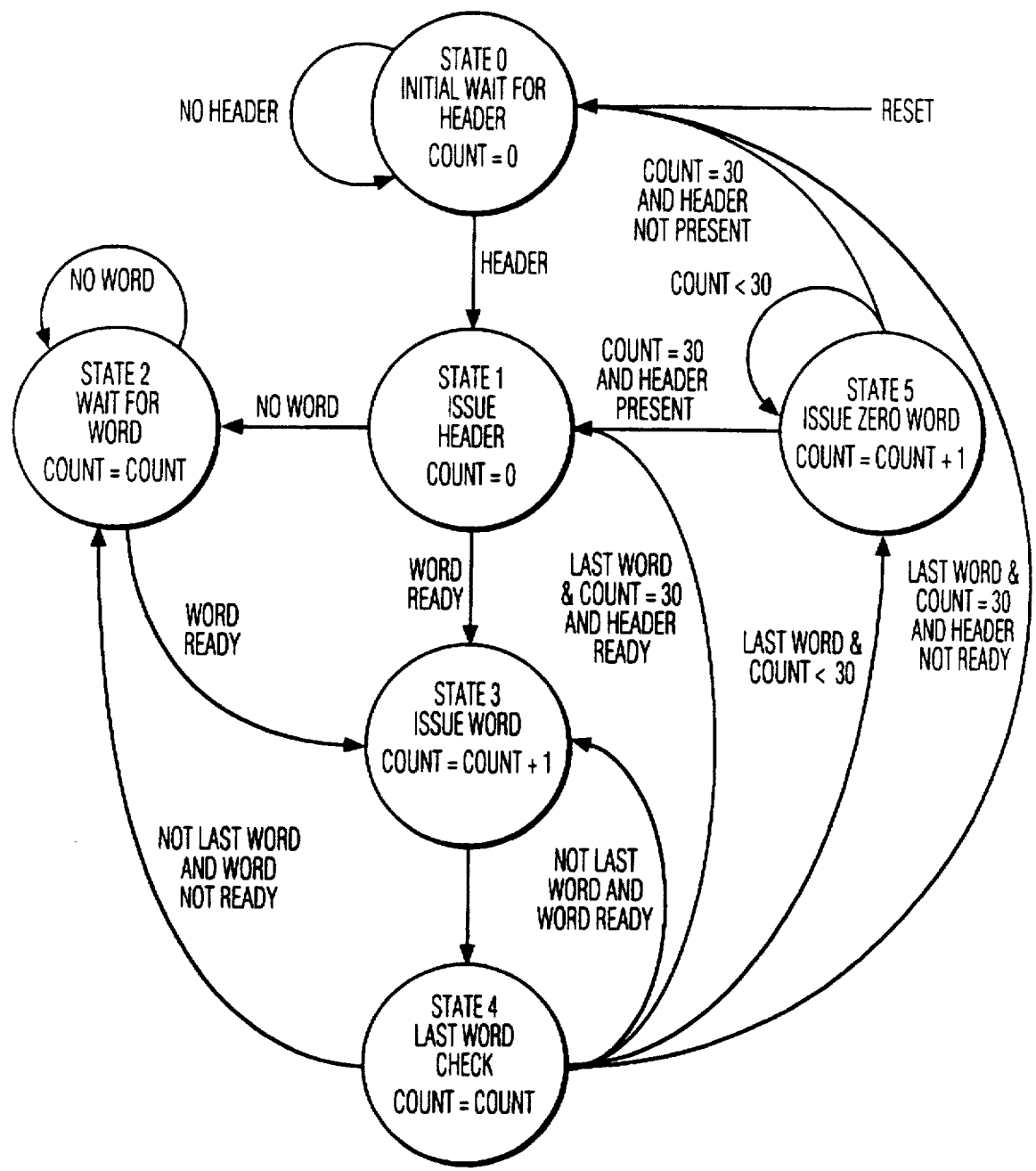
FIG. 18 is a state diagram associated with the operation of a state controller shown in FIG. 17.

Both FIFO units 70 and 72, multiplexer 76 and output register 78 are directed by controller 74, which is a state machine. After a power-on or similar restart, controller 74 waits for a header to be available. An available header is presented to the output bus of multiplexer 76, along with a Data Ready indicator and a Header Indicator. Controller 74 will then serve data FIFO 72, extracting data whenever it is available, until a Last Word indicator appears. Each data transmitted is accompanied by a Data Ready indicator which is conveyed to output register 78. If 30 data words have been serviced after the Last Word indicator appears, controller 74 will then re-examine header FIFO 70 for available information. If less than 30 data words have been serviced, controller 74 instructs multiplexer 76, by means of the Issue Zero command, to issue zero words for the balance of the packet. All such zero words are accompanied by a Data Ready indicator. Whenever there is no header or data to transmit, controller 74 instructs multiplexer 76 to issue zero words without any Data Ready indicator for the duration that data is unavailable. A flow chart (state diagram) depicting the state machine driven operation of combiner 15, as described above, is shown in FIG. 18. The Data Ready indicator and the Header Indicator are conveyed through output register 78 to rate buffers 713 and 714 in FIG. 19. These indicators signify to the rate buffers that there is data and header information on the bus, and maintain header/data registration to facilitate forward error correction (FEC) coding and data interleaving subsequent to the rate buffers. In this system (FIG. 19) the FEC and interleaving processes require that the headers be conveyed first, i.e., a header will commence transmission to the rate buffer before the data packet described by the header. The Empty Flag signals conveyed from header FIFO 70 and data FIFO 72 respectively indicate that no headers or data words are present, whereby state machine controller 74 idles. This condition is illustrated in the FIG. 18 diagram for the "No Header" and "No Word" conditions of State 0 and State 1. The Header/Data Select signal from controller 74 instructs multiplexer 76 to switch either the Header Output from unit 70 or the Data Output from unit 72 to the signal bus to the input of output register 78, when an associated Read Enable signal is conveyed to Header FIFO 70 or to Data FIFO 72, respectively.

Output buffer 78, to which zero words are added to an incomplete, abbreviated packet to produce a desired 30-word data packet, is considerably larger than preceding header buffer 70 and data buffer 72. These buffers advantageously continue to receive and process data without interruption. Such uninterrupted operation greatly simplifies timing and synchronizing functions, e.g., by eliminating clock stop/start synchronizing difficulties.

The use of complete packets of predetermined length, advantageously facilitated by means of adding null words as needed as described, facilitates searching and synchronizing in an arbitrary data condition such as is found in a variable length codeword system. A start codeword, particularly an I-frame start codeword, is a specific re-synchronizing point in an MPEG-compatible data stream. The start codeword appears at a packet boundary, the development of which is advantageously facilitated in the disclosed system by the use of zeroed-bit null words to complete a truncated data packet and define the packet boundary. The MPEG standard tolerates any number of zeroed words before a start codeword, and a receiver/decoder ignores the zeroed-bit null words. In this example, output buffer 78 is large and time resilient, and is therefore a convenient vehicle for performing the null word packing operation. In this regard it is noted that very little time is available (eg., one clock cycle) for null word packing between the appearance of a Packet Alignment Flag and a Picture Start codeword at a packet boundary.

FIG. 19 illustrates an exemplary HDTV encoding system which may employ apparatus according to the invention in the transport processor section. FIG. 19 shows the system processing a single video input signal, but it is to be understood that luminance and chrominance components are processed separately, and that luminance motion vectors are used for generating compressed chrominance components. The compressed luminance and chrominance components are interleaved to form macroblocks before codeword priority parsing. Additional information concerning the system of FIG. 19 is found in U.S. Pat. 5,168,356—Acampora et al.

A sequence of image fields/frames shown in FIG. 20A is applied to circuitry 705 which reorders the fields/frames according to FIG. 20B. The reordered sequence is applied to a compressor 710 which generates a compressed sequence of frames that are coded according to an MPEG-like format. This format is hierarchical and is illustrated in abbreviated form in FIG. 22. The MPEG hierarchical format includes a plurality of layers each with respective header information. Nominally each header includes a start code, data related to the respective layer and provision for adding header extensions.

When referring to the MPEG-like signal produced by the system, what is meant is that (a) successive picture fields/frames of video signals are encoded according to an I, P, B coding sequence, and (b) coded data at the picture level is encoded in MPEG-like slices or group of blocks, where the number of slices per field/frame may differ and the number of macro blocks per slice may differ. An I coded frame is one which is intraframe compressed such that only I frame compressed data is required to reproduce an image. P coded frames are coded according to a forward motion compensated predictive method, where the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

Figure 22:
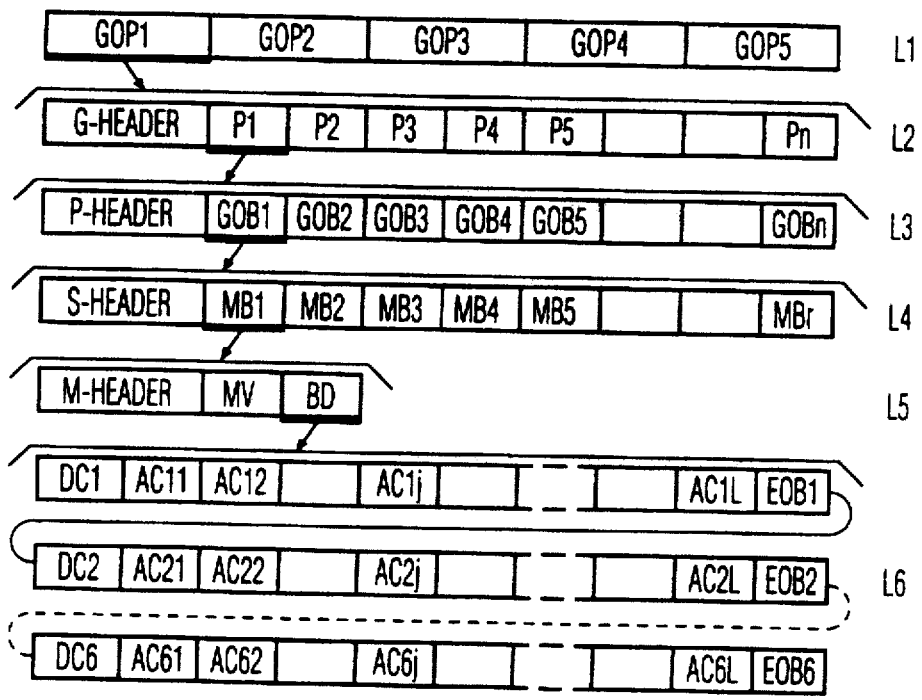
FIG. 22 is a generalized pictorial representation of the data format provided by the encoding/compression apparatus in the system of FIG. 19.

The coded output signal of the present system is segmented into groups of fields/frames, or groups of pictures (GOP) illustrated by the row of boxes L2 (FIG. 22). Each GOP (L2) includes a header followed by segments of picture data. The GOP header includes data related to the horizontal and vertical picture size, the aspect ratio, the field/frame rate, the bit rate, etc.

The picture data (L3) corresponding to respective picture fields/frames includes a picture header followed by slice data (L4). The picture header includes a field/frame number and a picture code type. Each slice (L4) includes a slice header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Each macroblock includes 6 blocks, including four luminance blocks, one U chrominance block and one V chrominance block (see FIG. 21). A block represents a matrix of pixels, e.g., 8×8, over which a discrete cosine transform (DCT) is performed. The four luminance blocks are a 2×2 matrix of contiguous luminance blocks representing, e.g., a 16×16 pixel matrix. The chrominance (U and V) blocks represent the same total area as the four luminance blocks. That is, before compression the chrominance signal is subsampled by a factor of two horizontally and vertically relative to luminance. A slice of data corresponds to data representing a rectangular portion of an image corresponding to an area represented by a contiguous group of macroblocks. A frame may include a raster scan of 360 slices, 60 slices vertically by 6 slices horizontally.

The block coefficients are provided one block at a time by the DCT. The DC coefficient occurs first, followed by respective DCT AC coefficients in the order of their relative importance. An end-of-block code EOB is appended at the end of each successively occurring block of data.

In FIG. 19, data from compressor 710 is processed by a prioritizer 711 before being provided to a transport processor 712 which segments the data into high priority (HP) and standard priority (SP) components. These components are coupled via rate buffers 713 and 714 to respective forward error coding units 715 and 716. The rate buffers temporarily store the packed data and headers for subsequent extraction by the FEC error coding networks. A rate controller 718 cooperates with buffers 713, 714 to adjust the average data rate provided by compressor 710. Thereafter the signals are coupled to a transmission modem 717 where the HP and SP data quadrature amplitude modulate respective carriers within a standard 6 MHz NTSC television channel.

---

APPENDIX A. LAST WORD GENERATION ALGORITHM

```
do positive_clock_edge = 1,∞
    if Packet_Alignment_Flag
        if packet_complete
            if remnant
                flag word ready coincident with
                packet_complete as last then flag short word ready on
                next clock as last
            else
                flag word ready coincident with packet_
                complete as last
        else
            if remnant
                flag word ready on next clock as last
            else
                if not true_zero
                    create a zero word on the next clock
                    and flag this pseudo word as last
                else continue (i.e., do nothing)
    else
        if packet_complete
            flag word ready coincident with
packet_complete as last
enddo
```

We claim:

1. Apparatus for processing an image representative variable length codeword datastream comprising:

means (12) responsive to said variable length codeword datastream for producing data packets including short data packets containing less than a prescribed number of words;

data processing means (15) for conveying said data packets to an output; and means (76, FIG. 17), included in said data processing means, for filling said short data packets with no-operation null words as needed to produce fixed length data packets having said prescribed number of words, and to define an inter-packet boundary at which a prescribed codeword may appear.

2. Apparatus according to claim 1, wherein said data processing means includes data selection means (76) for conveying a sequence of data packets and packet headers to said output, and for filling said short packets with said null words.

3. Apparatus according to claim 1, wherein said data processing means includes an input header buffer (70) for receiving headers containing information relating to contents of an associated data packet;

an input data buffer (72) for receiving said data packets; and an output buffer (78) for receiving a controlled sequence of headers and data packets from said header buffer and said data buffer respectively; wherein said data processing means including said data buffer, said header buffer and said output buffer exhibit uninterupted operation with respect to receiving and processing said headers and data packets.

4. Apparatus according to claim 3, wherein said null words are provided to said short data packets subsequent to said data and header buffers.

5. Apparatus according to claim 1, wherein said codewords include a Picture Start codeword associated with Group of Picture data and appearing at an inter-packet boundary.

6. Apparatus according to claim 5, wherein said datastream comprises MPEG codewords including said Picture Start codeword.

7. Apparatus according to claim 5, wherein Picture Start codeword is associated with intraframe coded I-frame image data.

* * * * *